United States Patent
Robinson et al.

(10) Patent No.: US 12,504,528 B2
(45) Date of Patent: Dec. 23, 2025

(54) SCANNING OPERATIONS FOR CO-LOCATED SATELLITE ANTENNAS

(71) Applicant: Viasat, Inc., Carlsbad, CA (US)

(72) Inventors: Parker A. Robinson, Ocala, FL (US); David J. Hancharik, Norcross, GA (US); Richard A. VanderMeulen, Dove Canyon, CA (US); Craig A. Miller, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 321 days.

(21) Appl. No.: 18/276,100

(22) PCT Filed: Feb. 4, 2022

(86) PCT No.: PCT/US2022/015335
§ 371 (c)(1),
(2) Date: Aug. 7, 2023

(87) PCT Pub. No.: WO2022/173669
PCT Pub. Date: Aug. 18, 2022

(65) Prior Publication Data
US 2024/0118405 A1    Apr. 11, 2024

Related U.S. Application Data

(60) Provisional application No. 63/147,519, filed on Feb. 9, 2021.

(51) Int. Cl.
*G01S 13/42*     (2006.01)
*G01S 7/41*      (2006.01)
(Continued)

(52) U.S. Cl.
CPC ............ *G01S 13/426* (2013.01); *G01S 7/411* (2013.01); *G01S 7/415* (2013.01); *G01S 13/878* (2013.01); *H04B 7/0617* (2013.01)

(58) Field of Classification Search
CPC ........ G01S 13/426; G01S 7/411; G01S 7/415; G01S 13/878; H04B 7/0617; H04B 7/2041
See application file for complete search history.

(56) References Cited

U.S. PATENT DOCUMENTS

2016/0211908 A1*  7/2016 Noerpel ............ H04B 7/18506

OTHER PUBLICATIONS

Steyskal et al., "Beamforming and signal processing with sparse, random arrays for space based radar", Aerospace Conference, 2004 Proceedings. 2004 IEEE, IEEE, Piscataway, NJ, USA, vol. 2, Mar. 6, 2004, pp. 887-896, XP010748039, DOI: 10.1109/AERO.2004. 1367688; ISBN: 978-0-7803-8155-1.
(Continued)

*Primary Examiner* — Bernarr E Gregory
*Assistant Examiner* — Naomi M Wolford
(74) *Attorney, Agent, or Firm* — Holland & Hart LLP

(57) ABSTRACT

Methods, systems, and devices for scanning operations for co-located satellite antennas are described. For instance, a set of co-located satellite antennas may transmit a set of component transmit signals to form a beam, where a first line segment at a boundary of the beam is tangential to a first sphere having a surface that encompasses Earth, where a location on the first line segment tangential to the surface of the first sphere is above a surface of the Earth by a threshold altitude. The set of co-located satellite antennas may receive a set of component receive signals including reflected energy of the beam. A central processor may apply a set of beamforming coefficients to the set of component receive signals to obtain a receive beam signal and may process the receive beam signal to obtain a signature associated with an object within a limb of the Earth.

18 Claims, 7 Drawing Sheets

(51) Int. Cl.
*G01S 13/87* (2006.01)
*H04B 7/06* (2006.01)

(56) References Cited

OTHER PUBLICATIONS

Franchl et al., "Pattern Synthesis for TechSat21—A distributed space-based radar system", IEEE Antennas and Propagation Magazine, IEEE Service Center, Piscataway, NJ, US, vol. Space-based radar, use of a small cluster of sat45, No. 4, Aug. 1, 2003, pp. 19-25, XP011102959. ISSN: 1045-9243.
Sarno Salvatore et al., "Modeling relative motion of LEO satellites at different altitudes", Acta Astronautica, Pergamon Press, Elmsford, GB, vol. 156, Oct. 23, 2018, pp. 197-27, XP085636541, ISSN: 0094-5765, DOI: 10.1016/J.ACTAASTRO.2018.10.034.
International Search Report and Written Opinion, PCT/US2022/015335, dated May 10, 2022, 9 pages.

\* cited by examiner

SCANNING OPERATIONS FOR CO-LOCATED SATELLITE ANTENNAS

CROSS REFERENCES

The present application for patent is a 371 national stage filing for International Patent Application No. PCT/US2022/015335 by PARKER et al., entitled "SCANNING OPERATIONS FOR COLOCATED SATELLITE ANTENNAS" filed Feb. 4, 2022, which claims the benefit of U.S. Provisional Patent Application No. 63/147,519 by Robinson et al., entitled "WIDE SCAN ANGLE LSNHRCA," filed Feb. 9, 2021, which is assigned to the assignee hereof and expressly incorporated by reference herein in its entirety.

BACKGROUND

The following relates generally to communications, including scanning operations for co-located satellite antennas.

Communications devices may communicate with one another using wired connections, wireless (e.g., radio frequency (RF)) connections, or both. Wireless communications between devices may be performed using wireless spectrum that has been designated for a service provider, wireless technology, or both. In some examples, the amount of information that can be communicated via a wireless communications network is based on an amount of wireless spectrum designated to the service provider, and an amount of frequency reuse within the region in which service is provided. Wireless communications (e.g., cellular communications, satellite communications, etc.) may use beamforming and multiple-input multiple-output (MIMO) techniques for communications between devices to increase frequency reuse, however, providing a high level of frequency reuse in some types of communication systems such as satellite communications presents challenges.

SUMMARY

The described techniques relate to improved methods, systems, devices, and apparatuses that support scanning operations for co-located satellite antennas. A system may include a set of co-located satellite antennas, where an inter-element spacing of satellite antennas of the set of co-located satellite antennas is different across the set of co-located satellite antennas. Additionally, the system may include a central processor configured to apply a first set of beamforming coefficients to a transmit beam signal to generate a set of component transmit signals for transmission by a set of co-located satellite antennas, where the set of co-located satellite antennas are configured to transmit the set of component transmit signals to form a beam at a first time, where a first line segment at a boundary of the beam is tangential to a first sphere having a surface that encompasses a planet, where a location on the first line segment tangential to the surface of the first sphere is above a surface of the planet by a threshold altitude, and where the set of co-located satellite antennas are configured to receive a plurality of component receive signals comprising reflected energy of the beam. Additionally, the central processor may be configured to a second set of beamforming coefficients to the plurality of component receive signals to obtain a receive beam signal associated with the beam and to process the plurality of receive beam signals based at least in part on the transmit beam signal to obtain a signature associated with an object within a limb of the planet defined by the first sphere and a second sphere that is concentric with and larger than the first sphere.

DETAILED DESCRIPTION

In some examples, co-located satellite antennas in a set of satellite antennas may form a beam in order to obtain a signature of (e.g., in order to scan) an object. If the object is located on the surface of the Earth, the reflected energy from the beam on the object may be subjected to background clutter (e.g., interference from other objects) and may have a terrestrial power flux-density transmission limit. The background clutter and the power-flux density transmission limit may decrease the likelihood that the co-located satellite antennas successfully scan the object.

In some examples, an object (e.g., a vehicle, such as a hypersonic vehicle) may be present in an atmospheric limb of the Earth, where an atmospheric limb may be defined as an atmospheric region defined by an arc of the Earth up to a particular atmospheric altitude (e.g., 100 km), the set of co-located satellite antennas may generate a beam with a boundary that is tangential to the first sphere. By generating the beam that is tangential to the first sphere, the set of satellite antennas may scan the object without background clutter introduced from the surface of the Earth. Additionally or alternatively, as no portion or a reduced portion of the beam interacts with the surface of the Earth, the set of co-located satellite antennas may not be subject to the power-flux density transmission limit. Accordingly, the likelihood that the co-located satellite antennas may successfully scan the object may increase when generating the beam with the boundary that is tangential to the first sphere as compared to generating a beam that scans the surface of the Earth.

Aspects of the disclosure are initially described in the context of wireless communications systems. Additional aspects of the disclosure are described in the context of a scanning scenario, a scanning sequence, and a limb scanning geometry. Aspects of the disclosure are further illustrated by and described with reference to apparatus diagrams, system diagrams, and flowcharts that relate to scanning operations for co-located satellite antennas.

Figure 1:
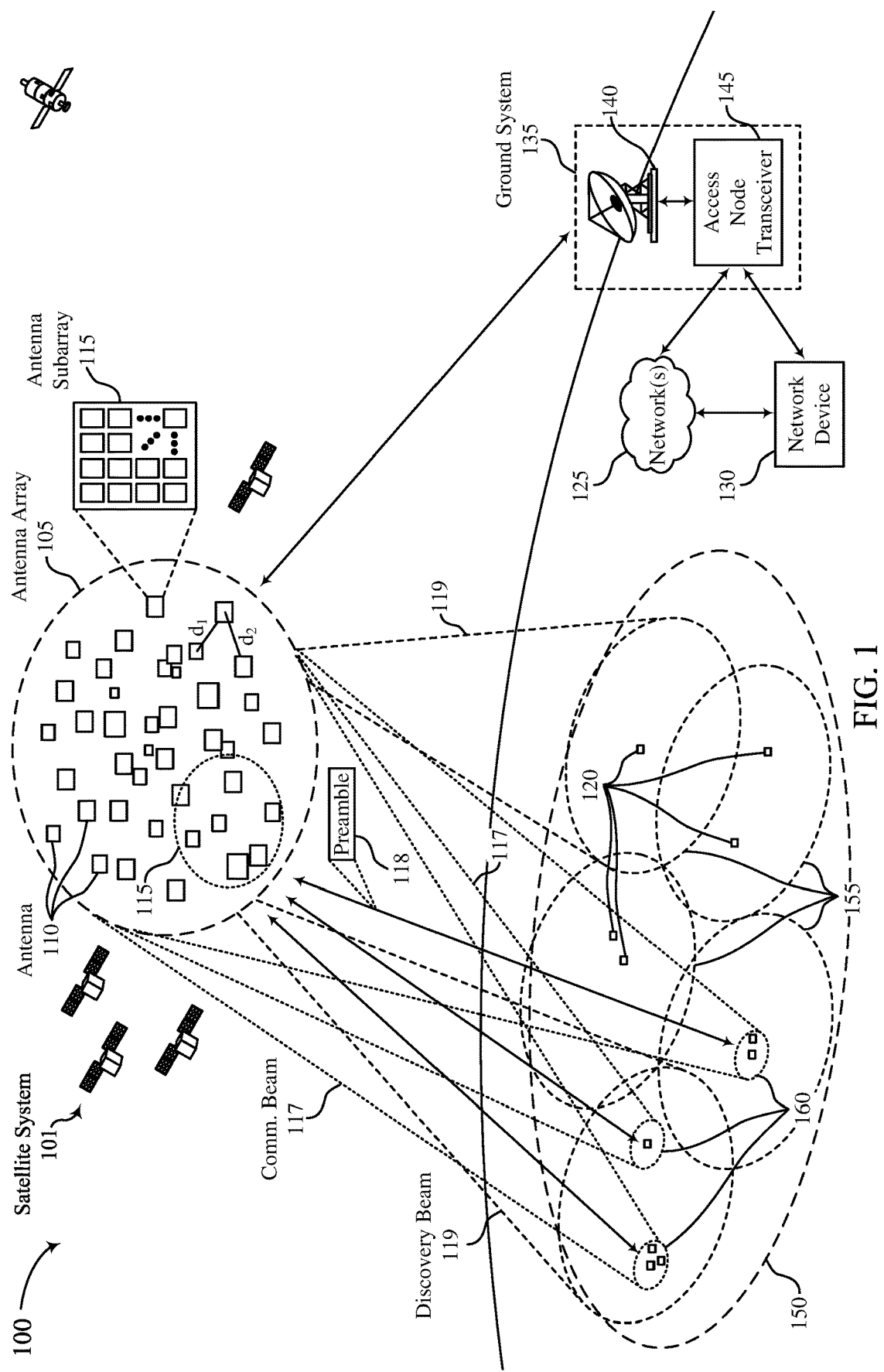
FIG. 1 illustrates an example of a satellite communications system that supports scanning operations for co-located satellite antennas in accordance with aspects of the present disclosure.

FIG. 1 shows an example of a satellite communications system 100 that supports beam management using sparse antenna arrays in accordance with examples described herein. Satellite communications system 100 may include a ground system 135, terminals 120, and satellite system 101. The ground system 135 may include a network of access nodes 140 that are configured to communicate with the satellite system 101. The access nodes 140 may be coupled with access node transceivers 145 that are configured to process signals received from and to be transmitted through corresponding access node(s) 140. The access node transceivers 145 may also be configured to interface with a network 125 (e.g., the Internet)—e.g., via a network device 130 (e.g., a network operations center, satellite and gateway terminal command centers, or other central processing centers or devices) that may provide an interface for communicating with the network 125.

Terminals 120 may include various devices configured to communicate signals with the satellite system 101, which may include fixed terminals (e.g., ground based stationary terminals) or mobile terminals such as terminals on boats, aircraft, ground based vehicles, and the like. A terminal 120 may communicate data and information with an access node 140 via the satellite system 101. The data and information may be communicated with a destination device such as a network device 130, or some other device or distributed server associated with a network 125.

The satellite system 101 may include a single satellite, or a network of satellites that are deployed in space orbits (e.g., low earth orbits, medium earth orbits, geostationary orbits, etc.). One or more satellites included in satellite system 101 may be equipped with multiple antennas 110 (e.g., one or more antenna arrays). In some cases, the multiple antennas 110 may be spread over a large region in space, and the antennas 110 may be sparsely located within the region. For example, the distance between the antennas 110 may be greater than a distance associated with a wavelength of signals supported for communication by the large, sparse antenna array—e.g., the distance between the antennas 110 may be greater than a distance associated with the wavelength. In some examples, the distance between the antennas 110 may be greater than ten times the wavelength. In some examples, in addition to being large and sparse, the antenna array 105 may be non-harmonic (e.g., the spacing between antennas 110 may be random or semi-random). For example, a first distance (d1) between a first antenna 110 and a second antenna 110 may be different than a second distance (d2) between the second antenna 110 and a third antenna 110, and so on throughout antenna array 105. In some examples, the distances between the antennas 110 of the antenna array 105 may be uncontrolled or partially controlled (e.g., unconstrained in one or more dimensions, or allowed to drift in one or more dimensions relative to other antennas 110).

In some examples, each of the multiple antennas 110 may include an antenna subarray 115 (e.g., one or more antenna panels that include an array of evenly distributed antenna elements). In some examples, one or more satellites may each be equipped with an antenna array including antennas that are unevenly distributed across a large region. In other examples, the antenna array may include antennas that are evenly distributed across the large region. In some examples, the antennas may be connected to a central entity via wired or wireless links. Deploying the antennas over the large region may increase an aperture size of the antenna array of the satellite relative to an antenna array that includes evenly distributed antennas (e.g., due to limitations associated with manufacturing and deploying a large antenna array with evenly distributed antennas). In some examples, a set of satellites, each including an antenna 110, are unevenly distributed across the large region, where each satellite may communicate with a central entity (e.g., a central server or ground station). In such cases, the antennas 110 of the set of satellites may be used to form an antenna array 105. In some examples, a set of satellites, each including an antenna 110, are unevenly distributed across the large region, where each satellite may communicate with a central entity (e.g., a central server or ground station).

The satellite system 101 may use the one or more satellites to support multiple-input multiple-output (MIMO) techniques to increase a utilization of frequency resources used for communications—e.g., by enabling wireless spectrum to be reused, in time and frequency, in different geographic regions of a geographic area. Similarly, the satellite system 101 may use the one or more satellites to support beamforming techniques to increase a utilization of frequency resources used for communications.

MIMO techniques may be used to exploit multipath signal propagation and increase spectral efficiency by transmitting or receiving multiple signals via different spatial layers. The multiple signals may, for example, be transmitted by a transmitting device (e.g., a satellite system) via a set of antennas in accordance with a set of weighting coefficients. Likewise, the multiple signals may be received by a receiving device (e.g., a satellite system) via a set of antennas in accordance with a set of weighting coefficients. Each of the multiple signals may be associated with a separate spatial stream and may carry bits associated with the same data stream (e.g., the same codeword) or different data streams (e.g., different codewords). MIMO techniques include single-user MIMO (SU-MIMO), where multiple spatial layers are used to communicate with one device, and multiple-user MIMO (MU-MIMO), where multiple spatial layers are used to communicate with multiple devices.

To determine weighting coefficients to apply to the set of antennas such that the N spatial layers are formed, an (M×N) MIMO matrix may be formed, where M may represent the quantity of antennas of the set of antennas. In some examples, M may be equal to N. The MIMO matrix may be determined based on a channel matrix and used to isolate the different spatial layers of the channel. In some examples, the weighting coefficients are selected to emphasize signals transmitted using the different spatial layers while reducing interference of signals transmitted in the other spatial layers. Accordingly, processing signals received at each antenna with the set of antennas (e.g., a signal received at the set of antennas) using the MIMO matrix may result in multiple signals being output, where each of the multiple signals may correspond to one of the spatial layers. The elements of the MIMO matrix used to form the spatial layers of the channel may be determined based on channel sounding probes received at a satellite system 101—e.g., from one or more devices. In some examples, the weighting coefficients used for MIMO communications may be referred to as beam coefficients, and the multiple signals or spatial layers may be referred to as beam signals.

Beamforming techniques may be used to shape or steer a communication beam along a spatial path between a satellite system 101 and a geographic area. A communication beam may be formed by determining weighting coefficients for antenna elements of antenna array that result in the signals transmitted from or received at the antenna elements being combined such that signals propagating in a particular orientation with respect to an antenna array experience constructive interference while others experience destructive interference. Thus, beamforming may be used to transmit signals having energy that is focused in a direction of a communication beam and to receive signals that arrive in a direction of the communication with increased signal power (relative to the absence of beamforming). The weighting coefficients may be used to apply amplitude offsets, phase offsets, or both to signals carried via the antennas. In some examples, the weighting coefficients applied to the antennas may be used to form multiple beams associated with multiple directions, where the multiple beams may be used to communicate multiple signals having the same frequency at the same time. The weighting coefficients used for beamforming may be referred to as beam coefficients, and the multiple signals may be referred to as beam signals.

In some examples, beamforming techniques may be used by a satellite system 101 to form spot beams that are tiled (e.g., tessellated) across a geographic area. In some examples, the wireless spectrum used by a satellite system 101 may be reused across sets of the spot beams for communications between terminals 120 and the satellite system. In some examples, the wireless spectrum can be reused in spot beams that do not overlap, where a contiguous geographic region can be covered by overlapping spot beams that each use orthogonal resources (e.g., orthogonal time, frequency, or polarization resources).

To support an increased quantity of users within a geographic area, an antenna array (which may be referred to as a large, sparse antenna array) having antennas with inter-element spacing that is different across the antenna array may be used to increase a resolution of beamforming techniques. That is, the large, sparse antenna array may be used (e.g., in combination with respective beam coefficients) to form communication beams with small coverage areas (e.g., less than 10 kilometers in diameter). A large, sparse antenna array, such as antenna array 105, may include multiple antennas 110 (e.g., hundreds or thousands of antennas) that are unevenly distributed across an area—e.g., in space. In some examples, each antenna 110 is, or is installed on, an individual satellite. In other examples, the antennas 110 are installed on a single satellite, where each antenna 110 is tethered to a central location—e.g., via a physical connection.

To form the small communication beams, geometric relationships between a geographic region and the antennas 110 of the large, sparse antenna array 105 may be used. In some examples, the geometric relationships between a geographic region and the antennas 110 of the large, sparse antenna array 105 may also be used to simplify the processing used for massive-MIMO techniques—e.g., based on the limited directions of signal incidence, location information known for the terminals, or any combination thereof.

In some examples, to support communicating using communication beams 117 with small coverage areas, a large, sparse antenna array 105 may be used (e.g., in combination with respective beam coefficients) to form discovery beams 119 within a geographic area 150, where each discovery beam 119 may be formed by a corresponding set of antennas 110 of the antenna array 105 and may cover a discovery area 155 within the geographic area 150. For example, each antenna subarray 115 may form a discovery beam 119, and the discovery beams may be tiled across the geographic area 150. Preambles 118 transmitted from terminals 120 within a discovery area 155 of a discovery beam 119 may be detected using the large, sparse antenna array 105 (e.g., each antenna subarray 115 may detect preambles 118 transmitted from within a corresponding discovery area 155). Based on detecting a preamble 118 using a discovery beam 119, a presence of a terminal 120 in a discovery area 155 of the discovery beam 119 may be determined.

In some examples, based on detecting the presence of the terminal 120 within a discovery area 155, one or more antennas 110 (e.g., an antenna subarray 115 or a group of antennas 110) may be selected to perform communications with the terminal 120. In some cases, the set of antennas 110 and a corresponding set of beamforming coefficients are used to form a wide communication beam that has a wide coverage area including a position of the terminal 120. In some examples, a size of the wide coverage area may be similar to a size of a discovery area 155.

In some examples, based on detecting the presence of the terminal 120, a second set of antennas 110 (e.g., antennas from more than one antenna subarray 115, a substantial portion of antennas 110, a majority of antennas 110, or all of the antennas 110) of the antenna array 105 and corresponding beam coefficients may be selected to form a communication beam 117 (e.g., a small or narrow beam) having a beam coverage area 160 within the discovery area 155 that includes a position of the terminal 120. The second set of antennas may include a larger quantity of antennas than the one or more antennas used to form the wide communication beam. Subsequently, signals detected at the antenna array 105 may be processed according to the beam coefficients used to form the narrow communication beam 117, resulting in a beam signal for the narrow communication beam 117. In some examples, the beam signal may include one or more signals transmitted from one or more terminals positioned within the beam coverage area 160.

In some examples, antenna array 105 includes multiple antenna subarrays 115, where each antenna subarray 115 may be used to form a discovery beam 119 associated with a corresponding discovery area 155. Preambles from a set of terminals 120 may be detected using a subset of the discovery beams 119. Based on detecting the terminals using the subset of the discovery beams 119, communication beams 117 may be formed (e.g., using geometric interpretation or MIMO-based techniques) within the corresponding discovery areas 155, where beam coverage areas 160 of the communication beams 117 may encompass the detected terminals 120. Communications may be performed between the antenna array 105 and detected terminals 120 using the communication beams 117, where at least a subset of the communication beams 117 may reuse common time, frequency, and polarization resources.

In some examples, techniques for supporting communications using wide and narrow communication beams may be used. For example, techniques for determining when to use a wide communication beam, narrow communication beams 117, or a combination thereof, may be used. For instance, narrow communication beams 117 within a wide coverage area of a wide communication beam may be activated based on a utilization of the wide communication beam reaching a threshold (e.g., greater than 80% of the capacity of the wide communication beam). In some examples, techniques for adjusting a beam coverage area 160 of a narrow communication beam 117 to increase a quality of signals received from a terminal 120 that is used as a reference for the narrow communication beam 117 may be used. Also, techniques for maintaining the beam coverage area 160 of the narrow communication beam 117 focused on a position of the reference terminal 120 (which may be referred to as "beam tracking") may be used. Additionally, techniques for adjusting a size of beam coverage areas 160 of narrow communication beams 117 (or for forming additional narrow communication beam 117) to accommodate other terminals may be used.

In some examples, a satellite system 101 may form a beam in order to obtain a signature of (e.g., in order to scan) an object. If the object is located on the surface of the Earth, the reflected energy from the object may be subjected to background clutter (e.g., interference from other objects) and may have a terrestrial power flux-density transmission limit. The background clutter and the power-flux density transmission limit may decrease the likelihood that the satellite system 101 can successfully scan the object.

In some examples, an object (e.g., a vehicle, such as a hypersonic vehicle) may be present in an atmospheric limb of the Earth, where an atmospheric limb may be defined as a region between a first sphere encompassing the Earth and a second sphere that is larger than the first sphere and concentric with the first sphere. When scanning the object in the atmospheric limb, the satellite system 101 may generate a beam with a boundary that is tangential to the first sphere. By generating the beam that is tangential to the first sphere, the satellite system 101 may scan the object without background clutter introduced from the surface of the Earth. Additionally or alternatively, as no portion or a reduced portion of the beam interacts with the surface of the Earth, the satellite system 101 may not be subject to the power-flux density transmission limit. Accordingly, the likelihood that the satellite system 101 may successfully scan the object may increase when generating the beam with the boundary that is tangential to the first sphere as compared to generating a beam that scans the surface of the Earth.

Figure 2:
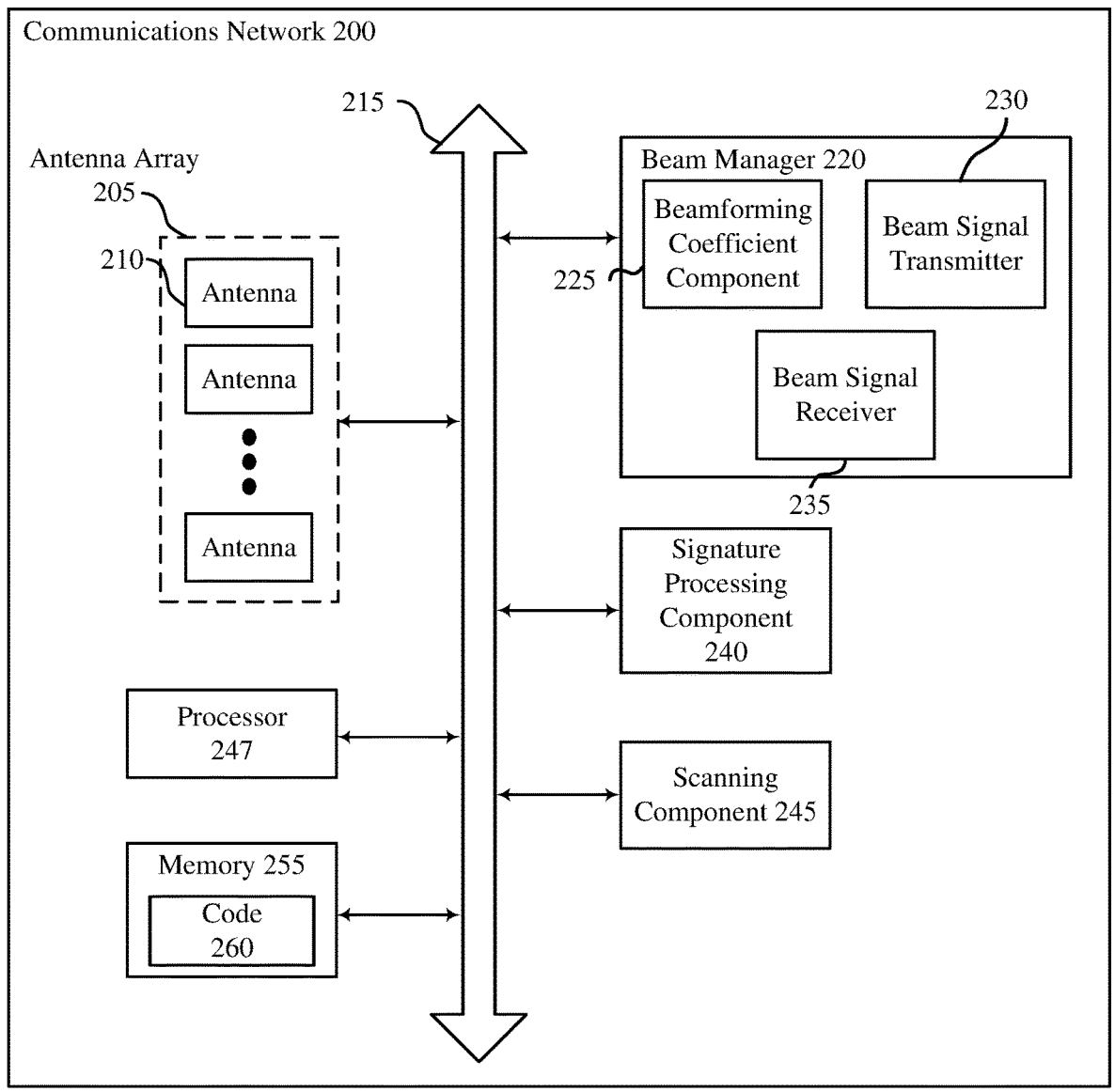
FIG. 2 illustrates an example of a communications network that supports scanning operations for co-located satellite antennas in accordance with aspects of the present disclosure.

FIG. 2 illustrates an example of a communications network 200 that supports scanning operations for co-located satellite antennas in accordance with aspects of the present disclosure.

Communications network 200 depicts a system for scanning an object located at a limb of a planet (e.g., Earth). Communications network 200 may include antenna array 205, bus 215, beam manager 220, signature processing component 240, scanning component 245, processor 247, and memory 255. At least a portion (e.g., some or all) of communications network 200 may be located within a space segment of communications network 200 (e.g., in a satellite system). In some examples, a portion of communications network 200 that is not included in the space segment may be located within a ground segment of communications network 200 (e.g., in a ground system). For example, antenna array 205, beam manager 220, signature processing component 240, scanning component 245, processor 247, and memory 255 may be included in a space segment of communications network 200. In another example, antenna array 205 may be included in a space segment of communications network 200, while beam manager 220, signature processing component 240, scanning component 245, processor 247, and memory 255 may be included in a ground segment of communications network 200.

Antenna array 205 may be an example of the antenna array of FIG. 1 and may include antennas 210. The antennas 210 may be examples of the antennas 110 described with reference to FIG. 1. In some examples, one or more of the antennas 210 may include an antenna subarray, similar to the antenna subarray 115 described with reference to FIG. 1. The spacing between the antennas 210 may be different across antenna array 205. In some examples, a distance (e.g., an average distance) between the antennas 210 is greater than a distance associated with a wavelength of signals communicated using antenna array 205. In some examples, a distance (e.g., an average distance) between the antennas 210 is greater than a distance associated with ten times the wavelength of the signals communicated using antenna array 205. In some examples, each antenna 210 may be an omnidirectional antenna. In some examples, each antenna 210 of antenna array 205 may be coupled with a respective satellite. In some such examples, the respective satellite coupled with at least one satellite antenna of the set of satellite antennas is different than the respective satellite coupled with another satellite antenna of the set of satellite antennas.

Bus 215 may represent an interface over which signals may be exchanged between antenna array 205 and a central location that may be used to distribute the signal to the signal processing components of communications network 200 (e.g., beam manager 220, signature processing component 240). Bus 215 may include a collection of wires that connect to each of the antennas. Additionally, or alternatively, bus 215 may be a wireless interface that is used to wirelessly communicate signaling between antenna array 205 and the signal processing components—e.g., in accordance with a communication protocol.

Beam manager 220 may be configured to form beams, including discovery beams, communication beams, geometric interpretation-based beams, MIMO-based beams, and the like. In some examples, beam manager 220 may be configured to form one or more discovery beams (e.g., the discovery beams that cover the discovery areas 155 of FIG. 1) within a geographic area (e.g., geographic area 150 of FIG. 1) that is covered by the antenna array 205. To form the discovery beams, native antenna patterns of sets of the antennas 210 may be used, or may be combined with beamforming techniques, MIMO techniques, or a combination thereof.

Beam manager 220 may also be configured to form one or more communication beams (e.g., the communication beams that form the beam coverage areas 160 of FIG. 1). To form the communication beams, geometric interpretation-based beamforming techniques, MIMO techniques, or geometrically-informed MIMO techniques may be used. Beam manager 220 may include beamforming coefficient component 225, beam signal transmitter 230 and beam signal receiver 235.

Beamforming coefficient component 225 may be configured to apply beamforming coefficients to beam signals to generate component signals and/or to component signals to generate beam signals. For instance, the beamforming coefficient component 225 may apply a first set of beamforming coefficients to a transmit beam signal to generate a set of component transmit signals for transmission by antenna array 205. Additionally, beamforming coefficient component 225 may be configured to apply a second set of beamforming coefficients to a set of component receive signals to obtain a receive beam signal associated with a beam. In some examples, beamforming coefficient component 225 may be configured to receive, via the antenna array 205 and from a system distinct from the antenna array 205 and/or the communications network 200, an indication of a beam direction, a velocity of an object, an acceleration of an object or any combination thereof. In some such examples, the beamforming coefficient component 225 may be configured to apply the first set of beamforming coefficients based on receiving the indication of the beam direction, the velocity of the object, the acceleration of the object, or any combination thereof.

In some examples, beamforming coefficient component 225 may apply one set of beamforming coefficients to multiple transmit beam signals. For instance, beamforming coefficient component 225 may apply the first set of beamforming coefficients to a second transmit beam signal to generate a second set of component transmit signals for transmission by the antenna array 205. In other examples, beamforming coefficient component 225 may apply different sets of beamforming coefficients to different transmit beam signals or different sets of component signals. For instance, beamforming coefficient component 225 may be configured to apply a third set of beamforming coefficients to a second transmit beam signal to generate a second set of component transmit signals for transmission by the antenna array 205. Additionally or alternatively, beamforming coefficient component 225 may be configured to apply, at a time different from when beamforming coefficient component 225 applies the second set of beamforming coefficients, a fourth set of beamforming coefficients to the second set of component receive signals to obtain a second set of receive beam signals associated with a translated beam.

In some examples, beamforming coefficient component 225 may update beamforming coefficients used to generate beam signals or sets of component signals based on previous beamforming coefficients and the signature obtained from a detected object. For instance, beamforming coefficient component 225 may generate the third set of beamforming coefficients based on the first set of beamforming coefficients and a signature obtained by signature processing component 240. In some examples, beamforming coefficient component 225 may update beamforming coefficients such that communications network 200 may track or scan an object.

Beam signal transmitter 230 may be configured to transmit, via the antenna array 205, component signals to form a beam. For instance, beam signal transmitter 230 may transmit, via the antenna array 205 at a first time, the set of component transmit signals to form the beam. In some examples, a first line segment at a boundary of the beam may be tangential to a first sphere having a surface that encompasses a planet (e.g., Earth), where a location on the first line segment tangential to the surface of the first sphere is above a surface of the planet by a threshold altitude.

In some examples, beam signal transmitter 230 may be configured to transmit additional component signals to form a translated beam relative to another beam that beam signal transmitter 230 transmitted. For instance, beam signal transmitter 230 may transmit, via the antenna array 205, the second set of component transmit signals to form the translated beam. In some such examples, a second line segment at a boundary of the translated beam may be tangential to the first sphere and a location on the second line segment tangential to the surface of the first sphere may be above the surface of the planet by the threshold altitude.

In some examples, beam signal receiver 235 may be configured to receive, via the antenna array 205, component signals and beamforming coefficient component 225 may form a beam (e.g., a receive beam) from the component signals. For instance, beam signal receiver 235 may be configured to receive, via the antenna array 205, a set of component receive signals including reflected energy of the beam. Additionally or alternatively, beam signal receiver 235 may be configured to receive additional component signals that form a translated beam relative to another beam that beam signal receiver 235 has received. For instance, beam signal receiver 235 may be configured to receive, via the antenna array 205, a second set of component receive signals including reflected energy of the translated beam.

Signature processing component 240 may be configured to process the receive beam signal based on the transmit beam signal to obtain a signature associated with an object within a limb of the planet defined by the first sphere and a second sphere that is concentric with and larger than the first sphere. In some examples, the signature may include a distance to the object, a displacement of the object over one or more of the set of times, an energy reflectivity of the object, a direction of movement of the object over one or more of the set of times, a speed of the object, a velocity of the object, an acceleration of the object, or any combination thereof. In some examples, signature processing component 240 may process the second set of receive beam signals based on the second transmit beam signal to obtain a second signature associated with the object within the limb of the planet.

Scanning component 245 may be configured to scan a beam in one or more directions over a set of time including the first time. For instance, scanning component 245 may indicate, to beam manager 220, to update beamforming coefficients to adjust a direction of a beam (e.g., a transmit beam, a receive beam) generated by beam manager 220. In some examples, scanning component 245 may use the signature to scan and/or track an object. For instance, if the signature includes information about a velocity of the object and a distance or location of the object, the scanning component 245 may track the object. Additionally or alternatively, scanning component 245 may determine whether the object is centered within the beam based on a strength of the signal. If the object is centered, scanning component 245 may indicate, to beam manager 220, to adjust beamforming coefficients to dither the beam in order to detect movement. Additionally or alternatively, the scanning component 245 may control beamforming coefficient component 225 to form separate concurrent receive beams to perform tracking. In some examples, scanning component 245 may indicate, to beam manager 220, to generate multiple receive beams at a same time in order to determine where an object is located in a transmit beam (e.g., how off-center the object is). In some examples, each of the multiple receive beams may be generated from the same set of component signals. Alternatively, different ones of the multiple receive beams may be generated from different subsets (e.g., overlapping subsets, disjoint subsets) of the set of component signals received by beam signal receiver 235. The multiple receive beams may be processed by scanning component (e.g., generating sum and/or difference signals between different receive beams) to track the object. Tracking an object using multiple concurrent receive beams may be referred to as synthetic monopulse tracking.

In some examples (e.g., if antenna array 205 is moving), antenna array 205 may act as a synthetic aperture radar (SAR). In some such examples, the difference in movement of the transmitter and receiver (e.g., the difference in movement between antenna array 205 at a first time versus antenna array 205 at a later time) may be used to increase an effective aperture size and/or improve spatial resolution of the antenna array 205. Using the antenna array 205 as a SAR may be performed if a velocity or speed of the object is determined to be below a threshold amount. In some examples, both SAR systems and non-SAR systems (e.g., an antenna array 205 collects each sample at a same time) may use a same scanning mechanism to collect data.

Processor 247 may include an intelligent hardware device (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 247 may be configured to execute computer-readable instructions stored in a memory (e.g., memory 255) to cause the communications network 200 to perform various functions (e.g., functions or tasks supporting beam management using sparse antenna arrays). For example, the communications network 200 or a component of the communications network 200 may include a processor 247 and memory 255 coupled to the processor 247 that are configured to perform various functions described herein.

The memory 255 may store code that is computer-readable and computer-executable. The code may include instructions that, when executed by the processor 247, cause the communications network 200 to perform various functions described herein. The code 260 may be stored in a non-transitory computer-readable medium such as system memory or another type of memory. In some cases, the code 260 may not be directly executable by the processor 247 but may cause a computer (e.g., when compiled and executed) to perform functions described herein. In some cases, the memory 255 may contain, among other things, a basic I/O system (BIOS) which may control basic hardware or software operation such as the interaction with peripheral components or devices.

In some examples, beam manager 220, beamforming coefficient component 225, beam signal transmitter 230, beam signal receiver 235, signature processing component 240, or various combinations or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, beam manager 220, beamforming coefficient component 225, beam signal transmitter 230, beam signal receiver 235, signature processing component 240, scanning component 245, or various combinations or components thereof, may be implemented in code 260 (e.g., as communications management software or firmware), executed by processor 247. If implemented in code 260 executed by processor 247, the functions of beam manager 220, beamforming coefficient component 225, beam signal transmitter 230, beam signal receiver 235, signature processing component 240, scanning component 245, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Figure 3:
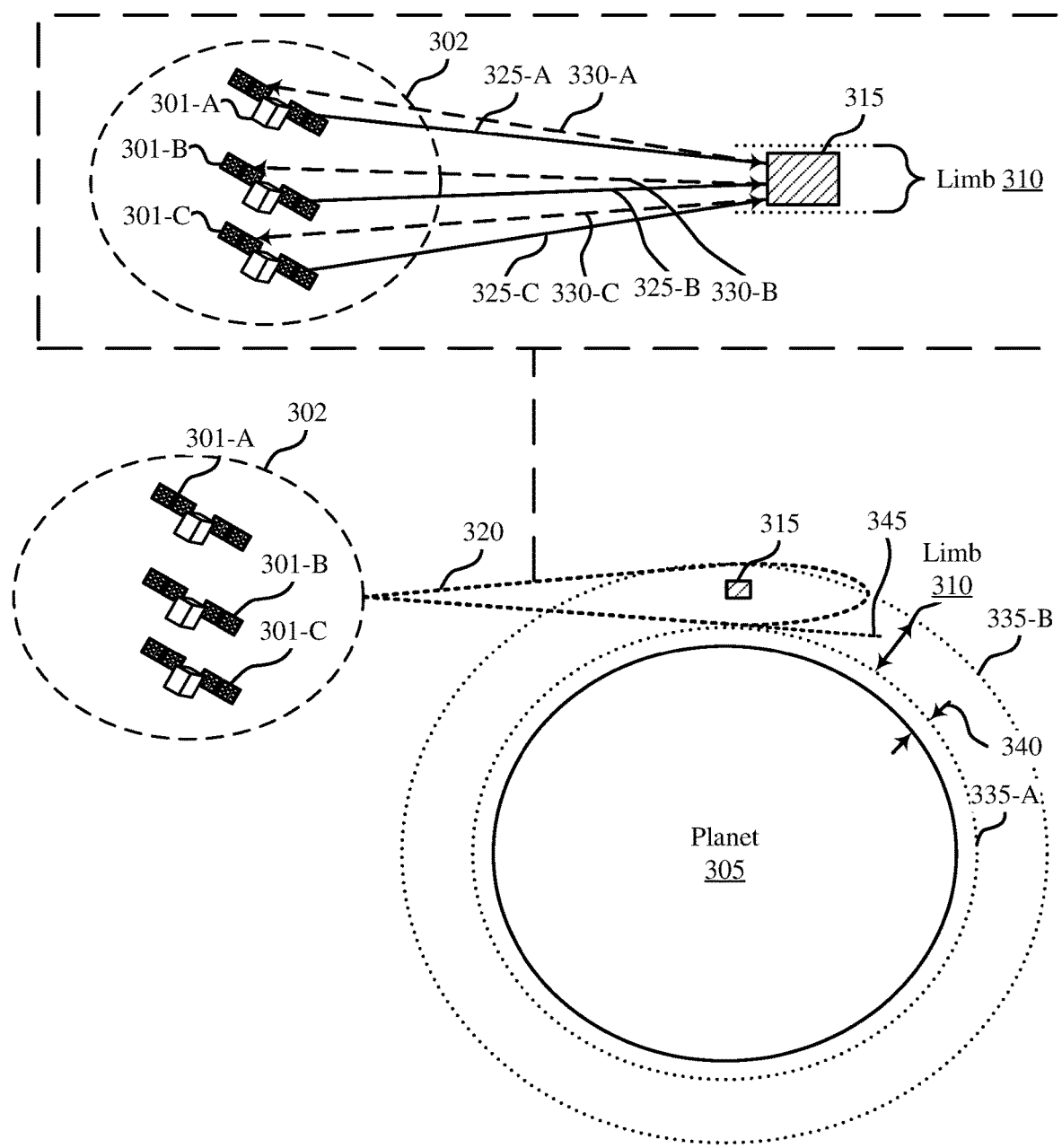
FIG. 3 illustrates an example of a scanning scenario that supports scanning operations for co-located satellite antennas in accordance with aspects of the present disclosure.

FIG. 3 illustrates an example of a scanning scenario 300 that supports scanning operations for co-located satellite antennas in accordance with aspects of the present disclosure.

In some examples, a set of co-located satellite antennas 302 (e.g., a satellite system 101 or a set of satellite systems 101 as described with reference to FIG. 1) may be deployed in space orbits (e.g., low earth orbits, medium earth orbits, geostationary orbits) relative to planet 305 (e.g., Earth). The set of co-located satellite antennas 302 may include satellite antennas 301-a, 301-b, and 301-c. In some examples, an object 315 may be located within a limb 310 of the planet 305. For instance, the limb 310 may be defined by a first sphere 335-a and a second sphere 335-b that is concentric with and larger than the first sphere 335-a. In some examples, each satellite antenna of the set of co-located satellite antennas 302 (e.g., satellite antennas 301-a, 301-b, and 301-c) may include an omnidirectional antenna. Additionally or alternatively, each satellite antenna of the set of antenna antennas may be coupled with a respective satellite, where the respective satellite coupled with at least one satellite antenna of the set of satellite antennas is different than the respective satellite coupled with another satellite antennas of the set of satellite antennas.

In some examples, a central processor (e.g., a processor of one of satellite antennas 301-a, 301-b, or 301-c, a processor of another satellite antenna configured to communicate with the set of co-located satellite antennas 302, or a processor of a ground terminal located on planet 305 that is configured to communicate with the set of co-located satellite antennas 302) may apply a first set of beamforming coefficients to a transmit beam signal to generate a set of component transmit signals (e.g., component transmit signals 325-a, 325-b, and 325-c) for transmission by the set of co-located satellite antennas 302. The set of co-located satellite antennas 302 may transmit the set of component transmit signals to form a beam 320. For instance, satellite antenna 301-a may transmit a first component transmit signal 325-a, satellite antenna 301-b may transmit a second component transmit signal 325-b, and satellite antenna 301-c may transmit a third component transmit signal 325-c. In some examples, a first line segment 345 at a boundary of the beam 320 may be tangential to the first sphere 335-a encompassing the planet 305. A location on the first line segment 345 tangential to the surface of the first sphere 335-a may be above a surface of the planet 305 by a threshold altitude 340. In some examples, the boundary of the beam 320 may be defined by a contour of a particular decibels (dB) point on a beam profile of the beam 320. For instance, the boundary of the beam 320 may be a 3 dB contour of the beam 320 or a 6 dB contour of beam 320. In some examples, the boundary may be configured such that that an amount of energy of the beam 320 that is directed towards the planet 305 is below a threshold amount and/or such that reflected energy is subjected to below a threshold amount of interference from the surface of the planet 305. In some examples, the set of co-located satellite antennas 302 may be configured to receive, from a system distinct from the set of co-located satellite antennas, an indication of a beam direction, a velocity of the object 315, an acceleration of the object 315, or any combination thereof. In some such examples, applying the first set of beamforming coefficients may be based at least in part on receiving the indication of the beam direction, the velocity of the object 315, the acceleration of the object 315, or any combination thereof.

In some examples, the set of co-located satellite antennas 302 may receive a set of component receive signals (e.g., component receive signals 330-a, 330-b, and 330-c) that include reflected energy of beam 320. For instance, object 315 may reflect at least a portion of the energy of beam 320. In one example, object 315 may reflect at least a portion of the energy of beam 320 as first component receive signal 330-a, at least a portion of the energy of beam 320 as second component receive signal 330-b, and at least a portion of the energy of beam 320 as third component receive signal 330-*c*. The central processor may apply a second set of beamforming coefficients to the set of component receive signals to obtain a receive beam signal associated with the beam and may process the receive beam signal based on the transmit beam signal to obtain a signature associated with object 315.

In some examples, the central processor may apply the first set of beamforming coefficients to a second transmit beam signal to generate a second set of component transmit signals for transmission by the set of co-located satellite antennas 302. In some such examples, the central processor may apply a space-time block code. For instance, the central processor may apply a set of beamforming coefficients and may transmit a different modulated signal using space-time block coding methods at a same frequency (e.g., as opposed to transmitting an identical modulated signal at the same frequency for each antenna element). By transmitting the different modulated signal using the space-time block coding methods, the central processor may form a first net transmit beam signal and a second net transmit beam signal, where processing the set of receive beam signals to obtain the signature is based on applying the space-time block code used in the first net transmit beam signal and the second net transmit beam signal. Space-time block coding may involve transmitting multiple related but different signals across multiple satellite antennas. In some examples, the relation of each modulated signal to each other modulated signal may be determined by the space-time block code.

In some examples, the techniques described herein may be associated with one or more advantages. For instance, scanning the limb 310 with a beam with a boundary tangential to first sphere 335-*a* may be associated with decreased background clutter as compared to scanning the surface of planet 305. Additionally, scanning the limb 310 with such a beam may have less stringent or non-existent constraints for terrestrial power-flux density. Accordingly, the likelihood of successfully scanning the object 315 may be increased as compared to an object on the surface of the planet 305. Additionally, scanning the object 315 in the limb 310 may be associated with reduced interference on transmissions that occur on the surface of the planet 305.

Figure 4:
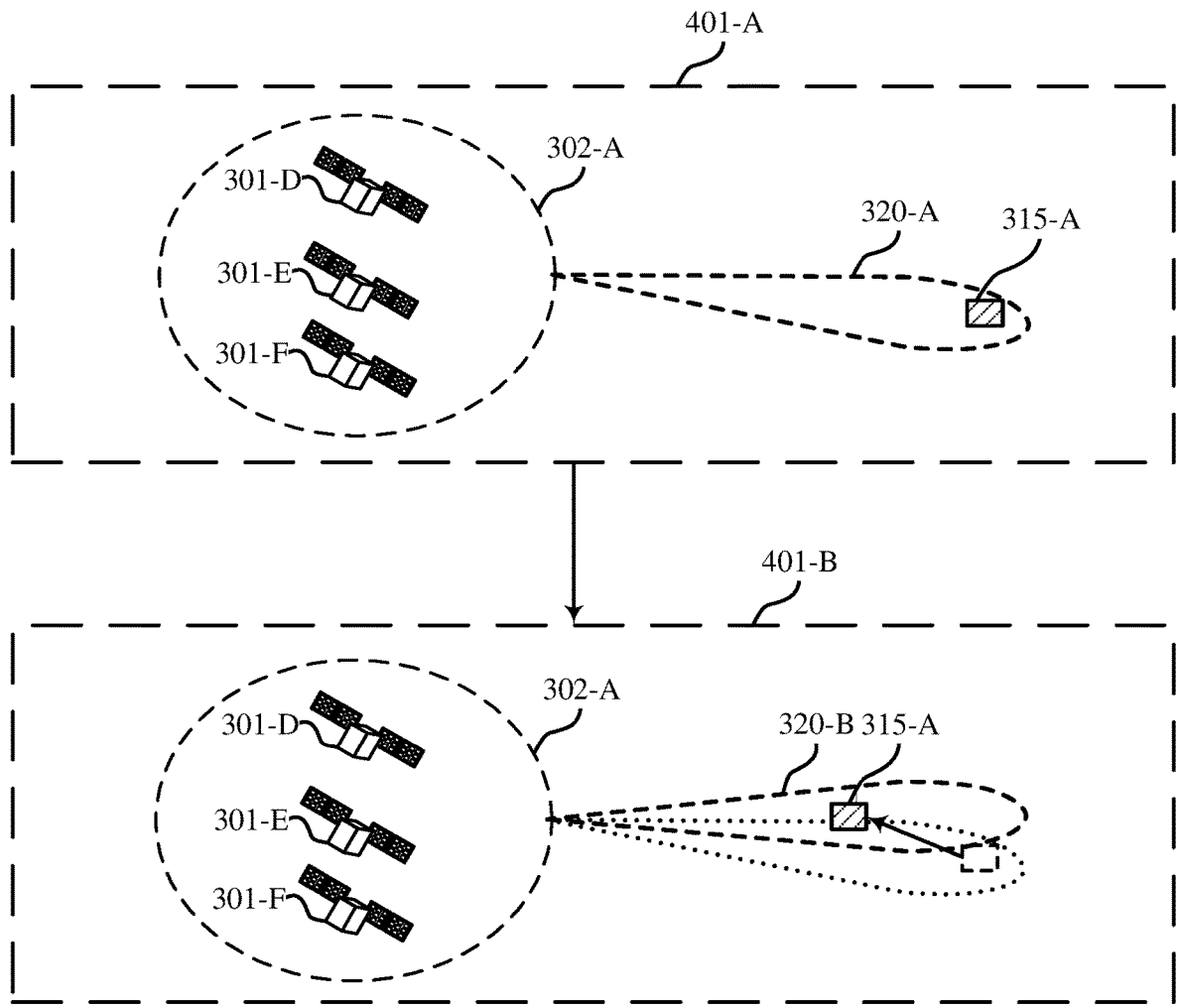
FIG. 4 illustrates an example of a scanning sequence that supports scanning operations for co-located satellite antennas in accordance with aspects of the present disclosure.

FIG. 4 illustrates an example of a scanning sequence 400 that supports scanning operations for co-located satellite antennas in accordance with aspects of the present disclosure. In some examples, scanning sequence 400 may implement one or more aspects of scanning scenario 300. For instance, set of co-located satellite antennas 302-*a* may be an example of a set of co-located satellite antennas 302 as described with reference to FIG. 3 and satellite antennas 301-*d*, 301-*e*, and 301-*f* may each be an example of a satellite antenna 301-*a*, 301-*b*, or 301-*c* as described with reference to FIG. 3. Additionally or alternatively, object 315-*a* may be an example of an object 315 as described with reference to FIG. 3 and beams 320-*a* and 320-*b* may be an example of a beam 320 as described with reference to FIG. 3.

At a first time 401-*a*, a central processor associated with set of co-located satellite antennas 302-*a* (e.g., a processor within the set of co-located satellite antennas 302-*a*, a processor associated with a satellite antenna excluded from the set of co-located satellite antennas 302-*a*, or a processor of a ground station configured to communicate with the set of co-located satellite antennas 302-*a*) may apply a first set of beamforming coefficients to a transmit beam signal to generate a set of component transmit signals for transmission by set of co-located satellite antennas 302-*a*. The set of co-located satellite antennas 302-*a* may transmit a set of component transmit signals to form beam 320-*a*. A first line segment at a boundary of beam 320-*a* may be tangential to a first sphere (e.g., sphere 335-*a* as described in FIG. 3) having a surface that encompasses a planet, where a location on the first line segment tangential to the surface of the first sphere. In some examples, the boundary of beam 320-*a* may be defined by a contour of a particular dB point. For instance, the boundary of beam 320-*a* may be a 3 dB contour of beam 320-*a* or a 6 dB contour of beam 320-*a*, although other values may also be used. In some examples, the boundary may be configured such that that an amount of energy of beam 320-*a* that is directed towards the planet is below a threshold amount (e.g., a power flux density limit) and/or such that reflected energy is subjected to below a threshold amount of interference from the surface of the planet. The set of co-located satellite antennas 302-*a* may receive a set of component receive signals including reflected energy of beam 320-*a*. The central processor may apply a second set of beamforming coefficients to the set of component receive signals to obtain a receive beam signal associated with the beam and may process the receive beam signal to obtain a signature associated with object 315-*a*.

At a second time 401-*b* (e.g., a time after 401-*a*) the central processor may apply a third set of beamforming coefficients to a second transmit beam signal to generate a second set of component transmit signals for transmission by the set of co-located satellite antennas 302-*a*. The set of co-located satellite antennas may transmit the second set of component transmit signals to form a translated beam 320-*b*, where a second line segment at a boundary of translated beam 320-*b* may be tangential to the surface of a third sphere that encompasses the planet. In some such examples, a location on the second line segment tangential to the surface of the third sphere may be above the surface of the planet by a second threshold altitude. In some examples, the third sphere may be smaller or larger than the first sphere depending on which direction (e.g., which direction horizontally, which direction vertically) the object 315-*a* moves from time 401-*a* to time 401-*b* and/or depending on a direction of beam 320-*b* relative to beam 320-*a*. In other examples, the third sphere may have a same size as the first sphere (e.g., if the object 315-*a* remains stationary). The set of co-located satellite antennas 302-*a* may receive a second set of component receive signals including reflected energy of translated beam 320-*b* and may apply a fourth set of beamforming coefficients to the second set of component receive signals to obtain a second set of receive beam signals associated with translated beam 320-*b*. In some such examples, the central processor may process the second set of receive beam signals based on the second transmit beam signal to obtain a second signature associated with the object 315-*a*.

By obtaining the signature at first time 401-*a* and the second signature at second time 401-*b*, the central processor may scan the beam in one or more directions over a set of times. In some examples, the one or more directions may include a first direction corresponding to a second time and a second direction corresponding to a third time, where the second direction is an opposing direction to the first direction. In some examples, the signature may include a distance to the object, a displacement of the object over one or more of the set of times, an energy reflectivity of the object, a direction of movement of the object over one or more of the set of times, a speed of the object, a velocity of the object, an acceleration of the object, or any combination thereof.

Figure 5:
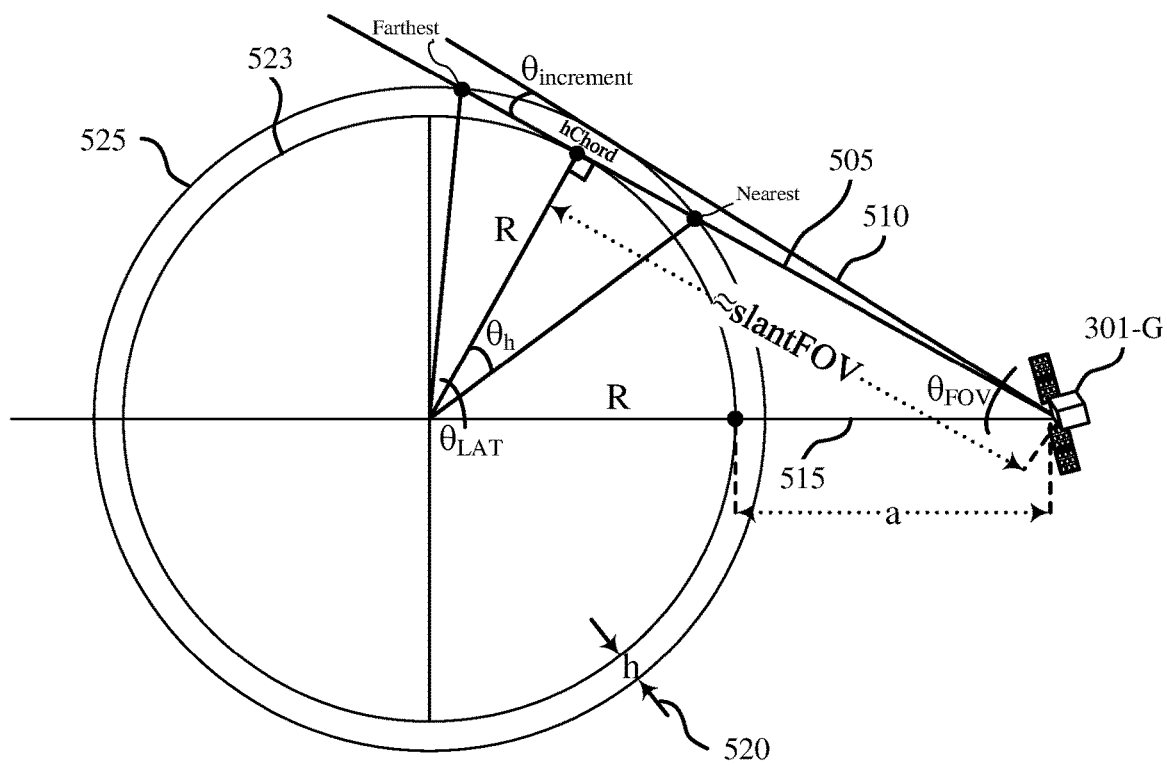
FIG. 5 illustrates an example of a limb scanning geometry that supports scanning operations for co-located satellite antennas in accordance with aspects of the present disclosure.

FIG. 5 illustrates an example of a limb scanning geometry 500 that supports scanning operations for co-located satellite antennas in accordance with aspects of the present disclosure. In some examples, limb scanning geometry 500 may implement one or more aspects of scanning scenario 300. For instance, satellite antenna 301-*g* may be an example of a satellite antenna 301-*a*, 301-*b*, or 301-*c* as described with reference to FIG. 3. Additionally or alternatively, satellite antenna 301-*g* may represent a set of satellite antennas (e.g., a set 302 as described with reference to FIG. 3). Inner sphere 523 may be an example of a planet 305 or first sphere 335-*a* as described with reference to FIG. 3, and outer sphere 525 may be an example of a first sphere 335-*a* or a second sphere 335-*b* as described with reference to FIG. 3.

Satellite antenna 301-*g* may have an altitude 515 (i.e., α) relative to inner sphere 523. Additionally, inner sphere 523 may have a radius R (e.g., approximately 6371 km). In some examples, satellite antenna 301-*g* may generate a scanning beam with an inner boundary 505 and an outer boundary 510. The inner boundary 505 of the scanning beam may be set at a grazing angle $\theta_{FOV}$ relative to nadir. A first intersection of inner boundary 505 with outer sphere 525 may be referred to as nearest and a second intersection of inner boundary 505 with outer sphere 525 may be referred to as farthest. Additionally, a third intersection of inner boundary 505 with inner sphere 523 may be referred to as tangent. An angle between inner boundary 505 and outer boundary 510 may be referred to as $\theta_{increment}$. An angle between nadir and a first line extending between a center of inner sphere 523 and tangent may be referred to as $\theta_{LAT}$. An angle between the first line extending between a center of inner sphere 523 and tangent and a second line extending between the center of inner sphere 523 and nearest may be referred to as $\theta_h$. In some examples, a width 520 between inner sphere 523 and outer sphere 525 may be referred to as h (e.g., a maximum altitude of a vehicle that may be scanned in an earth limb). In some examples, a distance from satellite antenna 301-*g* to tangent may be approximately slantFOV.

In some examples, slantFOV may be equal to $\sqrt{(R+\alpha)^2-R^2}=\sqrt{\alpha^2+2R\alpha}=(R+\alpha)\sin(\theta_{LAT})$. In some examples, hchord may be equal to $2\sqrt{(R+h)^2-R^2}=2\sqrt{h^2+2Rh}=2(R+h)\sin(\theta_h)$. In some examples, nearest may be equal to $$slantFOV - \frac{hChord}{2}$$

and farthest may be equal to $$slantFOV + \frac{hChord}{2}.$$

In some examples, $\theta_{LAT}$ may be equal to $$ArcSin(\frac{\sqrt{a^2+2Ra}}{R+a})$$

and $\theta_h$ may be equal to $$ArcSin(\frac{\sqrt{h^2+2Rh}}{R+h}).$$

In some examples, $\theta_{increment}$ may be defined as $$ArcTan(\frac{h}{slantFOV}).$$

In some examples, $\theta_{LAT}$ may be defined as a latitude angle relative to a nadir line. In some examples, $\theta_{LAT}$ may be equal to $$\frac{\pi}{2} - \theta_{FOV}$$

and $\theta_h$ may be defined as a deviation angle from $\theta_{LAT}$.

In cartesian coordinates, the coordinates of tangent may be (R $\cos(\theta_{LAT})$, R $\sin(\theta_{LAT})$) and TangentLine (e.g., inner boundary 505) may be defined as $$y = -x\cot(\theta_{LAT}) + \frac{R}{\sin(\theta_{LAT})}.$$

In some examples of cartesian coordinates, an $x_{intercept}$ of TangentLine may be defined as $R/\cos(\theta_{LAT})$ and a $y_{intercept}$ of TangentLine may be defined as $R/\sin(\theta_{LAT})$. In some examples of cartesian coordinates, nearest may have coordinates defined as ((R+h) $\cos(\theta_{LAT}-\theta_h)$, (R+h) $\sin(\theta_{LAT}-\theta_h)$) and farthest may have coordinates defined as ((R+h) $\cos(\theta_{LAT}+\theta_h)$, (R+h) $\sin(\theta_{LAT}+\theta_h)$). In some examples of cartesian coordinates, a NadirLine may be defined as (x, 0) where x may have an integer value, and a location of satellite antenna 301-*g* may be defined as (R+α, 0).

In polar coordinates (e.g., (ρ, θ)), tangent may be defined as (R, $\theta_{LAT}$) and TangentLine may be defined as $$(\frac{R}{\cos(\theta-\theta_{LAT})}, \theta).$$

Coordinates of satellite antenna 301-*g* may be defined as (R+α, 0) and coordinates of NadirLine may be defined as (ρ, 0). Coordinates of nearest may be defined as (R+h, $\theta_{LAT}-\theta_h$) and coordinates of farthest may be defined as (R+h, $\theta_{LAT}+\theta_h$).

Figure 6:
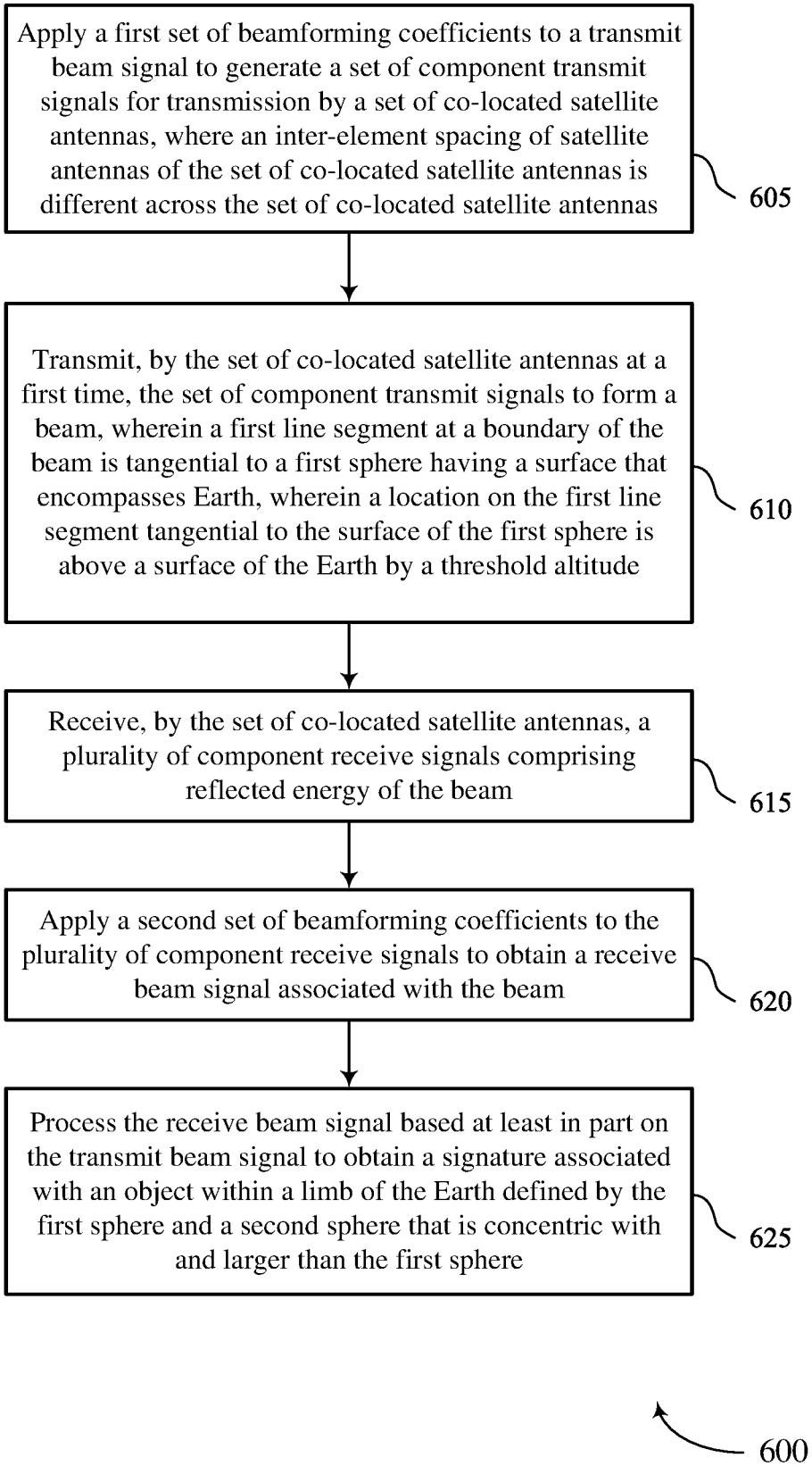
FIGS. 6 and 7 show flowcharts illustrating methods that support scanning operations for co-located satellite antennas in accordance with aspects of the present disclosure.

FIG. 6 shows a flowchart illustrating a method 600 that supports scanning operations for co-located satellite antennas in accordance with aspects of the present disclosure. The operations of the method 600 may be implemented by a communications network or its components as described herein. For example, the operations of the method 600 may be performed by a communications network 200 as described with reference to FIGS. 2 through 5. In some examples, a communications network may execute a set of instructions to control the functional elements of the communications network to perform the described functions. Additionally or alternatively, the communications network may perform aspects of the described functions using special-purpose hardware.

At 605, the method may include applying a first set of beamforming coefficients to a transmit beam signal to generate a set of component transmit signals for transmission by a set of co-located satellite antennas, where an inter-element spacing of satellite antennas of the set of co-located satellite antennas is different across the set of co-located satellite antennas. The operations of 605 may be performed in accordance with examples as disclosed herein.

At 610, the method may include transmitting, by the set of co-located satellite antennas at a first time, the set of component transmit signals to form a beam, where a first line segment at a boundary of the beam is tangential to a first sphere having a surface that encompasses a planet, where a location on the first line segment tangential to the surface of the first sphere is above a surface of the planet by a threshold altitude. The operations of 610 may be performed in accordance with examples as disclosed herein.

At 615, the method may include receiving, by the set of co-located satellite antennas, a set of multiple component receive signals including reflected energy of the beam. The operations of 615 may be performed in accordance with examples as disclosed herein.

At 620, the method may include applying a second set of beamforming coefficients to the set of multiple component receive signals to obtain a receive beam signal associated with the beam. The operations of 620 may be performed in accordance with examples as disclosed herein.

At 625, the method may include processing the receive beam signal based on the transmit beam signal to obtain a signature associated with an object within a limb of the planet defined by the first sphere and a second sphere that is concentric with and larger than the first sphere. The operations of 625 may be performed in accordance with examples as disclosed herein.

The following provides an overview of aspects of the present disclosure:

Aspect 1: A method, comprising: applying a first set of beamforming coefficients to a transmit beam signal to generate a set of component transmit signals for transmission by a set of co-located satellite antennas, wherein an inter-element spacing of satellite antennas of the set of co-located satellite antennas is different across the set of co-located satellite antennas; transmitting, by the set of co-located satellite antennas at a first time, the set of component transmit signals to form a beam, wherein a first line segment at a boundary of the beam is tangential to a first sphere having a surface that encompasses Earth, wherein a location on the first line segment tangential to the surface of the first sphere is above a surface of the Earth by a threshold altitude; receiving, by the set of co-located satellite antennas, a plurality of component receive signals comprising reflected energy of the beam; applying a second set of beamforming coefficients to the plurality of component receive signals to obtain a receive beam signal associated with the beam; and processing the receive beam signal based at least in part on the transmit beam signal to obtain a signature associated with an object within a limb of the Earth defined by the first sphere and a second sphere that is concentric with and larger than the first sphere.

Aspect 2: The method of aspect 1, further comprising: scanning the beam in one or more directions over a set of times comprising the first time.

Aspect 3: The method of aspect 2, wherein scanning the beam in the one or more directions comprises: applying, at a second time different than the first time, a third set of beamforming coefficients to a second transmit beam signal to generate a second set of component transmit signals for transmission by the set of co-located satellite antennas; transmitting, by the set of co-located satellite antennas, the second set of component transmit signals to form a translated beam; wherein a second line segment at a boundary of the translated beam is tangential to the first sphere, wherein a location on the second line segment tangential to the surface of the first sphere is above the surface of the Earth by the threshold altitude; receiving, by the set of co-located satellite antennas, a second plurality of component receive signals comprising reflected energy of the translated beam; applying a fourth set of beamforming coefficients to the second plurality of component receive signals to obtain a second receive beam signal associated with the translated beam; and processing the second receive beam signal based at least in part on the second transmit beam signal to obtain a second signature associated with the object within the limb of the Earth.

Aspect 4: The method of aspect 3, further comprising: generating the third set of beamforming coefficients based at least in part on the first set of beamforming coefficients and the signature.

Aspect 5: The method of any of aspects 2 through 4, wherein the signature comprises a distance to the object, a displacement of the object over one or more of the set of times, an energy reflectivity of the object, a direction of movement of the object over one or more of the set of times, a speed of the object, an acceleration of the object, or any combination thereof.

Aspect 6: The method of any of aspects 1 through 5, further comprising: receiving, at the set of co-located satellite antennas and from a system distinct from the set of co-located satellite antennas, an indication of a beam direction, a velocity of the object, an acceleration of the object, or any combination thereof, wherein applying the first set of beamforming coefficients is based at least in part on receiving the indication of the beam direction, the velocity of the object, the acceleration of the object, or any combination thereof Aspect 7: The method of any of aspects 1 through 6, further comprising: applying the first set of beamforming coefficients to a second transmit beam signal to generate a second set of component transmit signals for transmission by the set of co-located satellite antennas; and applying a space-time block code to the transmit beam signal and the second transmit beam signal, wherein processing the receive beam signal to obtain the signature is based at least in part on applying the space-time block code to the transmit beam signal and the second transmit beam signal.

Aspect 8: The method of any of aspects 1 through 7, wherein each satellite antenna of the set of co-located satellite antennas comprises an omnidirectional antenna.

Aspect 9: The method of any of aspects 1 through 8, wherein each satellite antenna of the set of co-located satellites antennas is coupled with a respective satellite, and the respective satellite coupled with at least one satellite antenna of the set of co-located satellite antennas is different than the respective satellite coupled with another satellite antenna of the set of co-located satellite antennas.

Aspect 10: An apparatus comprising a processor; memory coupled with the processor; and instructions stored in the memory and executable by the processor to cause the apparatus to perform a method of any of aspects 1 through 9.

Aspect 11: An apparatus comprising at least one means for performing a method of any of aspects 1 through 9.

Aspect 12: A non-transitory computer-readable medium storing code the code comprising instructions executable by a processor to perform a method of any of aspects 1 through 9.

Figure 7:
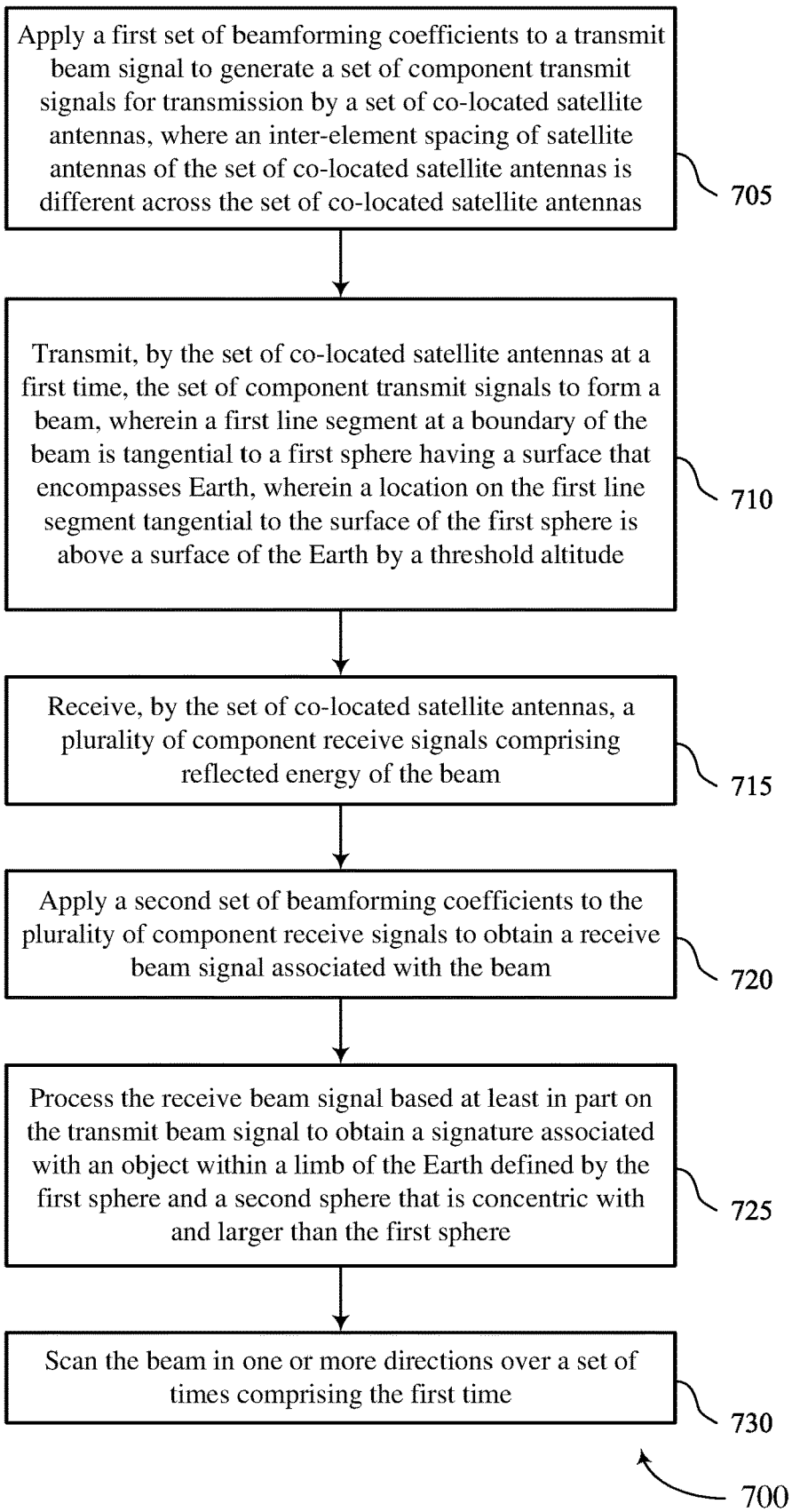

FIG. 7 shows a flowchart illustrating a method 700 that supports scanning operations for co-located satellite antennas in accordance with aspects of the present disclosure. The operations of the method 700 may be implemented by a communications network or its components as described herein. For example, the operations of the method 700 may be performed by a communications network as described with reference to FIGS. 1 through 5. In some examples, a communications network may execute a set of instructions to control the functional elements of the communications network to perform the described functions. Additionally or alternatively, the communications network may perform aspects of the described functions using special-purpose hardware.

At 705, the method may include applying a first set of beamforming coefficients to a transmit beam signal to generate a set of component transmit signals for transmission by a set of co-located satellite antennas, where an inter-element spacing of satellite antennas of the set of co-located satellite antennas is different across the set of co-located satellite antennas. The operations of 705 may be performed in accordance with examples as disclosed herein.

At 710, the method may include transmitting, by the set of co-located satellite antennas at a first time, the set of component transmit signals to form a beam, where a first line segment at a boundary of the beam is tangential to a first sphere having a surface that encompasses Earth, where a location on the first line segment tangential to the surface of the first sphere is above a surface of the Earth by a threshold altitude. The operations of 710 may be performed in accordance with examples as disclosed herein.

At 715, the method may include receiving, by the set of co-located satellite antennas, a set of multiple component receive signals including reflected energy of the beam. The operations of 715 may be performed in accordance with examples as disclosed herein.

At 720, the method may include applying a second set of beamforming coefficients to the set of multiple component receive signals to obtain a receive beam signal associated with the beam. The operations of 720 may be performed in accordance with examples as disclosed herein.

At 725, the method may include processing the receive beam signal based on the transmit beam signal to obtain a signature associated with an object within a limb of the Earth defined by the first sphere and a second sphere that is concentric with and larger than the first sphere. The operations of 725 may be performed in accordance with examples as disclosed herein.

At 730, the method may include scanning the beam in one or more directions over a set of times including the first time. The operations of 730 may be performed in accordance with examples as disclosed herein.

An apparatus is described. The following provides an overview of aspects of the apparatus as described herein:

Aspect 13: A system, comprising: a set of co-located satellite antennas, wherein an inter-element spacing of satellite antennas of the set of co-located satellite antennas is different across the set of co-located satellite antennas wherein an inter-element spacing of satellite antennas of the set of co-located satellite antennas is different across the set of co-located satellite antennas; and a central processor configured to: apply a first set of beamforming coefficients to a transmit beam signal to generate a set of component transmit signals for transmission by a set of co-located satellite antennas, wherein the set of co-located satellite antennas are configured to transmit the set of component transmit signals to form a beam at a first time, wherein a first line segment at a boundary of the beam is tangential to a first sphere having a surface that encompasses Earth, wherein a location on the first line segment tangential to the surface of the first sphere is above a surface of the Earth by a threshold altitude, and wherein the set of co-located satellite antennas are configured to receive a plurality of component receive signals comprising reflected energy of the beam; apply a second set of beamforming coefficients to the plurality of component receive signals to obtain a receive beam signal associated with the beam; and process the receive beam signal based at least in part on the transmit beam signal to obtain a signature associated with an object within a limb of the Earth defined by the first sphere and a second sphere that is concentric with and larger than the first sphere.

Aspect 14: The system of aspect 13, wherein the central processor is further configured to scan the beam in one or more directions over a set of times comprising the first time.

Aspect 15, The system of aspects 13 or 14, wherein, to scan the beam in the one or more directions over the set of times, the central processor is configured to apply a third set of beamforming coefficients to a second transmit beam signal to generate a second set of component transmit signals for transmission by a set of co-located satellite antennas, wherein the set of co-located satellite antennas are configured to transmit the second set of component transmit signals to form a translated beam, wherein a second line segment at a boundary of the translated beam is tangential to the first sphere, wherein a location on the second line segment tangential to the surface of the first sphere is above the surface of the Earth by the threshold altitude, and wherein the set of co-located satellite antennas are configured to receive, by the set of co-located satellite antennas, a second set of component receive signals comprising reflected energy of the translated beam; apply, at a second time different than the first time, a fourth set of beamforming coefficients to the second set of component receive signals to obtain a second plurality of receive beam signals associated with the translated beam; and process the second plurality of receive beam signals based at least in part on the second set of component transmit signals to obtain a second signature associated with the object within the limb of the Earth.

Aspect 16: The system of any of aspects 13 through 15, wherein the central processor is further configured to generate the third set of beamforming coefficients based at least in part on the first set of beamforming coefficients and the signature.

Aspect 17: The system of any of aspects 13 through 16, wherein the signature comprises a distance to the object, a displacement of the object over one or more of the set of times, an energy reflectivity of the object, a direction of movement of the object over one or more of the set of times, a speed of the object, an acceleration of the object, or any combination thereof.

Aspect 18: The system of any of aspects 13 through 17, wherein the set of co-located satellite antennas are configured to receive, from a system distinct from the set of co-located satellite antennas, an indication of a beam direction, a velocity of the object, an acceleration of the object, or any combination thereof, wherein the central processor being configured to apply the first set of beamforming coefficients is based at least in part on receiving the indication of the beam direction, the velocity of the object, the acceleration of the object, or any combination thereof Aspect 19: The system of any of aspects 13 through 18, wherein the central processor is further configured to: apply the first set of beamforming coefficients to a second transmit beam signal to generate a second set of component transmit signals for transmission by the set of co-located satellite antennas; and apply a space-time block code to the transmit beam signal and the second transmit beam signal, wherein processing the receive beam signal to obtain the signature is based at least in part on applying the space-time block code to the transmit beam signal and the second transmit beam signal.

Aspect 20: The system of any of aspects 13 through 19, wherein each satellite antenna of the set of co-located satellite antennas comprises an omnidirectional antenna.

Aspect 21: The system of any of aspects 13 through 20, wherein each satellite antenna of the set of co-located satellites antennas is coupled with a respective satellite, and wherein the respective satellite coupled with at least one satellite antenna of the set of co-located satellite antennas is different than the respective satellite coupled with another satellite antenna of the set of co-located satellite antennas.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
applying a first set of beamforming coefficients to a transmit beam signal to generate a set of component transmit signals for transmission by a set of co-located satellite antennas, wherein an inter-element spacing of satellite antennas of the set of co-located satellite antennas is different across the set of co-located satellite antennas;
transmitting, by the set of co-located satellite antennas at a first time, the set of component transmit signals to form a beam, wherein a first line segment at a boundary of the beam is tangential to a first sphere having a surface that encompasses Earth, wherein a location on the first line segment tangential to the surface of the first sphere is above a surface of the Earth by a threshold altitude;
receiving, by the set of co-located satellite antennas, a plurality of component receive signals comprising reflected energy of the beam;
applying a second set of beamforming coefficients to the plurality of component receive signals to obtain a receive beam signal associated with the beam; and
processing the receive beam signal based at least in part on the transmit beam signal to obtain a signature associated with an object within a limb of the Earth defined by the first sphere and a second sphere that is concentric with and larger than the first sphere.

2. The method of claim 1, further comprising:
scanning the beam in one or more directions over a set of times comprising the first time.

3. The method of claim 2, wherein scanning the beam in the one or more directions comprises:
applying, at a second time different than the first time, a third set of beamforming coefficients to a second transmit beam signal to generate a second set of component transmit signals for transmission by the set of co-located satellite antennas;
transmitting, by the set of co-located satellite antennas, the second set of component transmit signals to form a translated beam; wherein a second line segment at a boundary of the translated beam is tangential to the first sphere, wherein a location on the second line segment tangential to the surface of the first sphere is above the surface of the Earth by the threshold altitude;
receiving, by the set of co-located satellite antennas, a second plurality of component receive signals (comprising reflected energy of the translated beam;
applying a fourth set of beamforming coefficients to the second plurality of component receive signals to obtain a second receive beam signal associated with the translated beam; and
processing the second receive beam signal based at least in part on the second transmit beam signal to obtain a second signature associated with the object within the limb of the Earth.

4. The method of claim 3, further comprising:
generating the third set of beamforming coefficients based at least in part on the first set of beamforming coefficients and the signature.

5. The method of claim 2, wherein the signature comprises a distance to the object, a displacement of the object over one or more of the set of times, an energy reflectivity of the object, a direction of movement of the object over one or more of the set of times, a speed of the object, an acceleration of the object, or any combination thereof.

6. The method of claim 1, further comprising:
receiving, at the set of co-located satellite antennas and from a system distinct from the set of co-located satellite antennas, an indication of a beam direction, a velocity of the object, an acceleration of the object, or any combination thereof, wherein applying the first set of beamforming coefficients is based at least in part on receiving the indication of the beam direction, the velocity of the object, the acceleration of the object, or any combination thereof.

7. The method of claim 1, further comprising:
applying the first set of beamforming coefficients to a second transmit beam signal to generate a second set of component transmit signals for transmission by the set of co-located satellite antennas; and
applying a space-time block code to the transmit beam signal and the second transmit beam signal, wherein processing the receive beam signal to obtain the signature is based at least in part on applying the space-time block code to the transmit beam signal and the second transmit beam signal.

8. The method of claim 1, wherein each satellite antenna of the set of co-located satellite antennas comprises an omnidirectional antenna.

9. The method of claim 1, wherein each satellite antenna of the set of co-located satellite antennas is coupled with a respective satellite, and wherein the respective satellite coupled with at least one satellite antenna of the set of co-located satellite antennas is different than the respective satellite coupled with another satellite antenna of the set of co-located satellite antennas.

10. A system, comprising:
a set of co-located satellite antennas, wherein an inter-element spacing of satellite antennas of the set of co-located satellite antennas is different across the set of co-located satellite antennas; and
a central processor configured to:
apply a first set of beamforming coefficients to a transmit beam signal to generate a set of component transmit signals for transmission by a set of co-located satellite antennas, wherein the set of co-located satellite antennas are configured to transmit the set of component transmit signals to form a beam at a first time, wherein a first line segment at a boundary of the beam is tangential to a first sphere having a surface that encompasses Earth, wherein a location on the first line segment tangential to the surface of the first sphere is above a surface of the Earth by a threshold altitude, and wherein the set of co-located satellite antennas are configured to receive a plurality of component receive signals comprising reflected energy of the beam;

apply a second set of beamforming coefficients to the plurality of component receive signals to obtain a receive beam signal associated with the beam; and process the receive beam signal based at least in part on the transmit beam signal to obtain a signature associated with an object within a limb of the Earth defined by the first sphere and a second sphere that is concentric with and larger than the first sphere.

11. The system of claim 10, wherein the central processor is further configured to scan the beam in one or more directions over a set of times comprising the first time.

12. The system of claim 11, wherein, to scan the beam in the one or more directions over the set of times, the central processor is configured to:

apply, at a second time different than the first time, a third set of beamforming coefficients to a second transmit beam signal to generate a second set of component transmit signals for transmission by a set of co-located satellite antennas, wherein the set of co-located satellite antennas are configured to transmit the second set of component transmit signals to form a translated beam, wherein a second line segment at a boundary of the translated beam is tangential to the first sphere, wherein a location on the second line segment tangential to the surface of the first sphere is above the surface of the Earth by the threshold altitude, and wherein the set of co-located satellite antennas are configured to receive, by the set of co-located satellite antennas, a second set of component receive signals comprising reflected energy of the translated beam;

apply a fourth set of beamforming coefficients to the second set of component receive signals to obtain a second plurality of receive beam signals associated with the translated beam; and process the second plurality of receive beam signals based at least in part on the second set of component transmit signals to obtain a second signature associated with the object within the limb of the Earth.

13. The system of claim 12, wherein the central processor is further configured to generate the third set of beamforming coefficients based at least in part on the first set of beamforming coefficients and the signature.

14. The system of claim 11, wherein the signature comprises a distance to the object, a displacement of the object over one or more of the set of times, an energy reflectivity of the object, a direction of movement of the object over one or more of the set of times, a speed of the object, an acceleration of the object, or any combination thereof.

15. The system of claim 10, wherein the set of co-located satellite antennas are configured to receive, from a system distinct from the set of co-located satellite antennas, an indication of a beam direction, a velocity of the object, an acceleration of the object, or any combination thereof, wherein the central processor being configured to apply the first set of beamforming coefficients is based at least in part on receiving the indication of the beam direction, the velocity of the object, the acceleration of the object, or any combination thereof.

16. The system of claim 10, wherein the central processor is further configured to:

apply the first set of beamforming coefficients to a second transmit beam signal to generate a second set of component transmit signals for transmission by the set of co-located satellite antennas; and apply a space-time block code to the transmit beam signal and the second transmit beam signal, wherein processing the receive beam signal to obtain the signature is based at least in part on applying the space-time block code to the transmit beam signal and the second transmit beam signal.

17. The system of claim 10, wherein each satellite antenna of the set of co-located satellite antennas comprises an omnidirectional antenna.

18. The system of claim 10, wherein each satellite antenna of the set of co-located satellite antennas is coupled with a respective satellite, and wherein the respective satellite coupled with at least one satellite antenna of the set of co-located satellite antennas is different than the respective satellite coupled with another satellite antenna of the set of co-located satellite antennas.

* * * * *